US009004520B2

(12) United States Patent
Madison

(10) Patent No.: US 9,004,520 B2
(45) Date of Patent: Apr. 14, 2015

(54) TRAILER JACK ADAPTOR AND METHOD

(71) Applicant: Kent R. Madison, Echo, OR (US)

(72) Inventor: Kent R. Madison, Echo, OR (US)

( * ) Notice: Subject to any disclaimer, the term of this patent is extended or adjusted under 35 U.S.C. 154(b) by 0 days.

(21) Appl. No.: 13/791,831

(22) Filed: Mar. 8, 2013

(65) Prior Publication Data
US 2013/0285349 A1    Oct. 31, 2013

Related U.S. Application Data

(60) Provisional application No. 61/638,415, filed on Apr. 25, 2012.

(51) Int. Cl.
B60D 1/40    (2006.01)

(52) U.S. Cl.
CPC ........................................ B60D 1/40 (2013.01)

(58) Field of Classification Search
CPC ........................................................ B60D 1/40
USPC ........... 254/418, 419, 420, 423, 425; 280/5.3, 280/477, 475; 403/348, 349, 353
See application file for complete search history.

(56) References Cited

U.S. PATENT DOCUMENTS

| | | | |
|---|---|---|---|
| 2,153,722 A | | 4/1939 | Loughmiller |
| 2,219,907 A | * | 10/1940 | Ross ................................ 279/93 |
| 3,345,037 A | * | 10/1967 | Sweetland, Jr. ............... 254/420 |
| 3,425,714 A | | 2/1969 | Morris |
| 3,580,543 A | | 5/1971 | Hafeli |
| 3,841,663 A | | 10/1974 | Proffit |
| 3,863,894 A | | 2/1975 | Mansi et al. |
| 4,202,528 A | * | 5/1980 | Foster ............................ 254/420 |
| 4,352,505 A | | 10/1982 | Chambers |
| 4,441,693 A | | 4/1984 | Silver |
| 4,623,125 A | | 11/1986 | Ebey |
| 4,871,183 A | | 10/1989 | Moss |
| 5,011,119 A | | 4/1991 | Harrington |
| 5,174,550 A | | 12/1992 | Pittman |
| 6,302,381 B1 | | 10/2001 | Roll |
| 7,648,154 B2 | | 1/2010 | Green |
| 8,167,330 B2 | | 5/2012 | MacDougall |
| 2010/0213427 A1 | | 8/2010 | Trowbridge et al. |
| 2011/0215286 A1 | | 9/2011 | Harper |

OTHER PUBLICATIONS

Seven pictures of a product called Jack Saver downloaded from the internet which indicates they were published on Jan. 14, 2013.

* cited by examiner

*Primary Examiner* — Joseph Rocca
*Assistant Examiner* — Felicia L Brittman
(74) *Attorney, Agent, or Firm* — Klarquist Sparkman, LLP

(57) ABSTRACT

In one example, a jack adaptor is mounted to a trailer structure. A jack flange, which can comprise a jack flange extension, of a jack is inserted downwardly through an opening in an upper portion of the jack adaptor. The jack can be rotated to a position that misaligns the jack flange with the opening through which it has been inserted. The jack can then be actuated to raise the jack flange into engagement with the upper portion of the adaptor for use in raising the trailer structure. The process is reversed to disengage the jack flange from the adaptor to permit removal of the jack.

17 Claims, 11 Drawing Sheets

US 9,004,520 B2

TRAILER JACK ADAPTOR AND METHOD

CROSS REFERENCE TO RELATED APPLICATION

This application claims the benefit of U.S. Provisional Application Ser. No. 61/638,415, entitled TRAILER JACK ADAPTOR AND METHOD, filed on Apr. 25, 2012, which is incorporated by reference herein.

BACKGROUND

In a conventional approach, a trailer jack is bolted in a fixed position to the tongue structure of a trailer. The trailer jack has a handle that is rotated in one direction to raise a post portion of the jack. The handle is rotated in the opposite direction to lower a post portion of the jack. When lowered, the post portion engages the ground or other supporting surface with continued lowering of the post pushing against the supporting surface to raise the tongue of a trailer. Conversely, operating the jack to raise the post results in lowering the tongue of the trailer for example on to the ball of a trailer hitch. Once the trailer hitch is engaged, the post is raised to clear the ground. It is easy for the owner of a trailer to forget to raise the post sufficiently to clear obstacles encountered as the towed trailer is being moved. If the post engages an obstacle, it can be bent, thereby ruining the jack.

Therefore, a need exists for an improved jack mounting system.

SUMMARY

Figure 1:
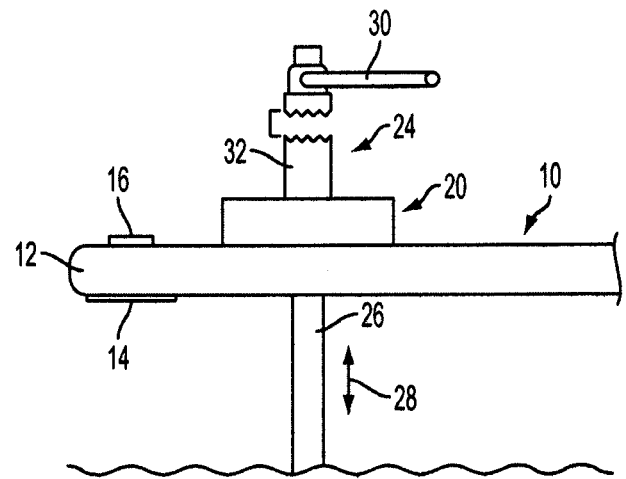
FIG. 1 is a side elevational view of a jack and an exemplary embodiment of a mounting adaptor that detachably couples the jack to the trailer.

In accordance with an exemplary embodiment of an adaptor for detachably coupling a jack to a trailer structure, in one form the jack adaptor loosely receives the jack and a jack flange thereof without requiring threaded bolts to intercouple the jack flange and the adaptor. The adaptor engages the jack flange for use in raising and lowering the trailer structure when a jack is actuated.

In accordance with another aspect of an embodiment, the jack flange, with or without a jack flange extension comprising a portion thereof, is aligned with an opening through an upper adaptor wall, inserted through the opening, and then rotated to a position where the jack flange is no longer aligned with the opening through the upper wall. Upon actuating the jack to extend the jack, the jack flange, or extension thereof, if used, is moved into engagement with the undersurface of the upper wall of the adaptor to raise the trailer structure. To remove the jack from the trailer structure in this embodiment, one lowers the jack to disengage the jack flange or jack flange extension from the undersurface of the upper wall of the adaptor. Thereupon the jack can be rotated to shift the jack flange or adaptor to a position in alignment with an opening through the upper wall of the adaptor. This permits the jack flange and jack to be removed through the opening to thereby detach the jack from the adaptor.

In accordance with an aspect of an embodiment, no bolts need to be unthreaded to remove the jack from the adaptor. In a specifically desirable embodiment, no clips or fasteners of any type are required to be loosened to remove the jack.

In accordance with aspects of an embodiment, a trailer hitch adaptor is disclosed for mounting to a trailer hitch structure of a trailer for use in detachably receiving a jack used to raise and lower the trailer. The jack can be of a conventional construction, such as with or comprising a jack housing comprising a first end portion and a jack flange mounted to the jack housing. The jack flange can come with the jack or be added later. The jack also desirably comprises a jack post extendable from the jack housing and retractable at least partially into the jack housing through the first end portion of the jack housing. The term jack post is to be broadly construed to encompass any extendable and retractable element. In this embodiment, the adaptor can comprise a body comprising first and second spaced apart walls, the first wall comprising a first opening and the second wall comprising a second opening at least partially aligned with the first opening. The openings are desirably sized and positioned for insertion of the jack post through the first and second openings. As another aspect of this embodiment, the first opening is sized and shaped to permit the insertion of the jack flange in one direction therethrough when the jack is in a first position relative to the first opening and to prevent the passage of the jack flange in the opposite direction through the first opening upon rotation of the jack flange to a second position relative to the first opening.

Also, the second wall is desirably adapted for mounting to the trailer hitch structure. In accordance with another aspect, the second wall of the adaptor can comprise a plurality of fastener receiving openings for receiving fasteners to couple the body to the trailer hitch structure.

In accordance with an aspect of an embodiment, the jack flange can be trapezoidal in shape and the first opening can also be trapezoidal in shape. In addition, the second opening can be circular.

As additional aspects of an embodiment, the adaptor can comprise first and second walls that each have a respective peripheral boundary. Also, the body can comprise a sidewall interconnecting at least a portion of the peripheral boundary of the first wall to at least a portion of the peripheral boundary of the second wall. The body can also be of a right cylindrical shape. The first and second walls can comprise a first top plate and a second bottom plate. These plates can be circular. The sidewall can be of a right cylindrical shape and can interconnect the peripheries of the sidewalls.

As yet another aspect, the adaptor can comprise a first opening that is non-circular in shape. For example, the first opening can comprise a plurality of lobe openings. The first opening in a specific exemplary form can be tri-lobular with three lobe openings. Also, the jack flange can comprise a plural lobed jack flange extension. The term extension encompasses a separate element for coupling to a jack flange. In addition, the term extension also encompasses a single or plural piece jack flange extending outwardly from a jack, such as from a jack housing. In an example wherein the first opening is tri-lobular, the jack flange can comprise three lobes.

As a further aspect, plural bolts can extend through a jack flange extension to bolt the jack flange extension to a jack flange. The ends of these bolts can comprise adaptor engaging projections.

In a specific exemplary form, the jack flange can comprise plural jack adaptor engaging members extending outwardly from the jack housing. Also, the trailer hitch adaptor can comprise a first opening having a center. The adaptor can also comprise plural openings or lobe openings each with a base spaced from the center of the first opening. The lobe openings can each be separated from one another by a land. The lands can have a periphery spaced nearer to the center of the first opening than the bases of the lobe openings. Each land can comprise a projection accommodating recess, such as a bolt head accommodating recess. The jack flange extension can comprise a respective projection extending upwardly from each jack adaptor engaging member. These projections can comprise portions of jack flange extension mounting bolts. The projections can be arranged such that the projections are each positioned within a respective projection accommodating recess upon rotation of the jack flange to the second position.

As another aspect, the adaptor can be loosely received by the trailer hitch adaptor without any fasteners coupling the jack or jack flange to the trailer hitch adaptor.

In accordance with additional aspects of an embodiment, the second wall of the trailer hitch adaptor can comprise a plurality of fastener receiving openings for receiving fasteners to couple the body to the trailer hitch. Also, the first and second walls can each have a respective peripheral boundary. The body can comprise a sidewall interconnecting at least a portion of the peripheral boundary of the first wall to at least a portion of the peripheral boundary of the boundary of the second wall. In addition, the jack flange can comprise a three lobed jack flange extension. Plural bolts can extend through the jack flange extension to bolt the jack flange extension to the jack flange. The first opening can comprise three radially extending lobe openings, each with a base spaced from the center of the first opening. The lobe openings can each be separated from one another by a land with a periphery of the land spaced nearer to the center of the first opening than the bases of the lobe openings. Each land can comprise a projection or bolt accommodating recess. The bolts that bolt the jack flange extension to the jack flange can be arranged such that the bolts are each positioned within a respective bolt accommodating recess when the jack flange is in the second position. Alternative forms of projections can be used.

In accordance with further aspects of an exemplary embodiment, a trailer hitch adaptor can comprise an adaptor body mounted to a trailer hitch structure. The adaptor body can comprise an opening sized for insertion of the jack post therethrough. In addition, the body can detachably engage the jack flange for use in jacking up the trailer without bolting the body to the jack flange using threaded bolts. The jack can also be detachable from the body without requiring loosening of threaded bolts to remove the jack from the trailer hitch adaptor. As another aspect of an embodiment, the jack can detachably engage the body when the jack flange is in at least one first position of rotation relative to the adaptor body. In addition, the jack can be removable from the body upon rotation of the jack to at least one second rotational position relative to the body.

In accordance with an embodiment of a method of detachably coupling a jack to a trailer hitch adaptor, the method can comprise inserting a jack post downwardly through upper and lower openings through the adaptor; rotating the jack while in an upright position to place the jack flange at a first rotational position relative to the upper opening; inserting the jack flange downwardly through the upper opening but not through the lower opening; rotating the jack while in the upright orientation to place the jack flange into a second rotational position relative to the upper opening; extending the jack post to commence jacking up the trailer; and engaging the jack flange with a portion of the adaptor bounding the upper opening to block the passage of the jack flange away from the lower opening and through the upper opening such that extension of the jack post jacks up the trailer.

As still further aspects of an embodiment, an adaptor is disclosed for detachably coupling a jack to a trailer for use in jacking the trailer. The jack can comprise a jack housing with a jack housing longitudinal axis and a jack flange projecting outwardly from the housing. The jack can also comprise a jack post extendable from the jack housing to raise the trailer during jacking and retractable into the jack housing to lower the trailer during jacking. The adaptor can comprise: a housing comprising first and second spaced apart end portions and a body portion joining the first end portion to the second end portion, the second end portion being adapted for coupling to the trailer with the first end portion positioned at an elevation above the second end portion; the first end portion comprising a first opening therethrough and the second end portion comprising a second opening extending therethrough, the first and second openings overlying one another, at least in part, and being sized such that the jack post is insertable through both the first and second openings from above when the second portion is coupled to the trailer, the first opening being sized and shaped such that the jack flange is insertable downwardly through the first opening into the space between the first and second end portions at least when the jack housing is in one rotational position about the jack housing longitudinal axis relative to the first opening and such that the jack flange engages the first end portion at least when the jack housing is in a second rotational position about the jack housing longitudinal axis to prevent upward removal of the jack flange and jack through the first opening, whereby when the jack housing is in the second position, extension of the jack post from the jack housing operates to jack up the trailer.

As yet additional aspects of an embodiment, the first and second end portions can comprise respective first and second end plates each with a respective periphery and wherein the body portion comprises a wall extending about the periphery of the first and second end plates.

As still further aspects of an embodiment, the first opening can comprise a non-circular geometric shape and the second opening can be circular. The first opening can also comprise a plurality of lobe openings separated by lands positioned between the lobe openings. Also, the lands can each comprise a respective recess extending into the land in a direction away from the center of the first opening. As another aspect of an embodiment, the jack flange can comprise plural projections projecting upwardly from the jack flange, each projection being positioned to engage a respective one of the recesses of the first opening at least when the jack housing is in the second rotational position.

As a further aspect of an embodiment, the jack flange can comprise a jack flange attachment adapted for mounting to the jack flange. The jack flange attachment can comprise plural radially extending jack adaptor engaging members. The jack flange attachment can, in one form, comprise a tri-lobular attachment. The first opening can also comprise a tri-lobular opening. As a more specific exemplary aspect, the first opening can have three lobe openings defined by an interior peripheral edge of the first end portion, each of said lobe openings having a neck portion defined by converging walls that converge in a direction away from the center of the first opening and an enlarged end portion communicating with the neck portion and positioned at a location further from the center of the first opening than the neck portion.

This disclosure is directed to all novel and non-obvious aspects of a jack adaptor and related methods as disclosed herein, as well as of components thereof such as a jack flange extension when used. It should be noted that the adaptor openings as well as the shape of the jack flange extension, if used, can be varied from the embodiments disclosed herein. The embodiments disclosed herein provide ornamental features not required for operation of the adaptor. For example, in the case of a jack flange extension, the extension can be of a plural projection design, such as tri-lobular, with the lobes or projections taking different configurations from the configurations disclosed herein while still achieving the function thereof.

DETAILED DESCRIPTION

FIG. 1 illustrates a portion of a trailer 10 having a tongue 12 with a socket 14 for receiving a ball (not shown) of a trailer hitch. A conventional latch 16 is included for locking the hitch to the ball. A jack mounting adaptor 20 is shown coupled to the trailer 10, such as bolted to the trailer tongue structure, for detachably receiving a jack 24. The jack 24 comprises a supporting post or stem 26 movable upwardly or downwardly, as indicated by arrow 28, upon rotation of a handle 30 in respective clockwise or counterclockwise directions. The post 26 is coupled to a jack housing 32 so as to be axially movable within the jack housing 32 upon rotation of the handle 30. The post 26 can, for example, be threadedly coupled to the housing in a jackscrew configuration in a conventional manner.

Figure 4:
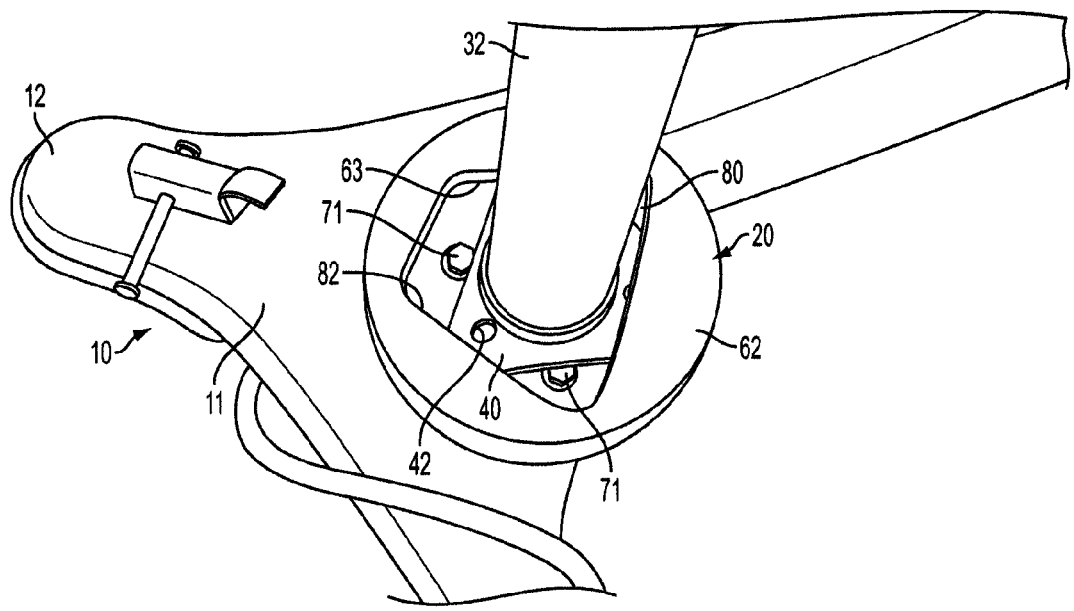
FIG. 4 is a top perspective view of a jack positioned within the mounting adaptor with a jack flange portion of the jack engaging a portion of the mounting adaptor to support the trailer tongue in position as the jack post is raised or lowered.
Figure 5:
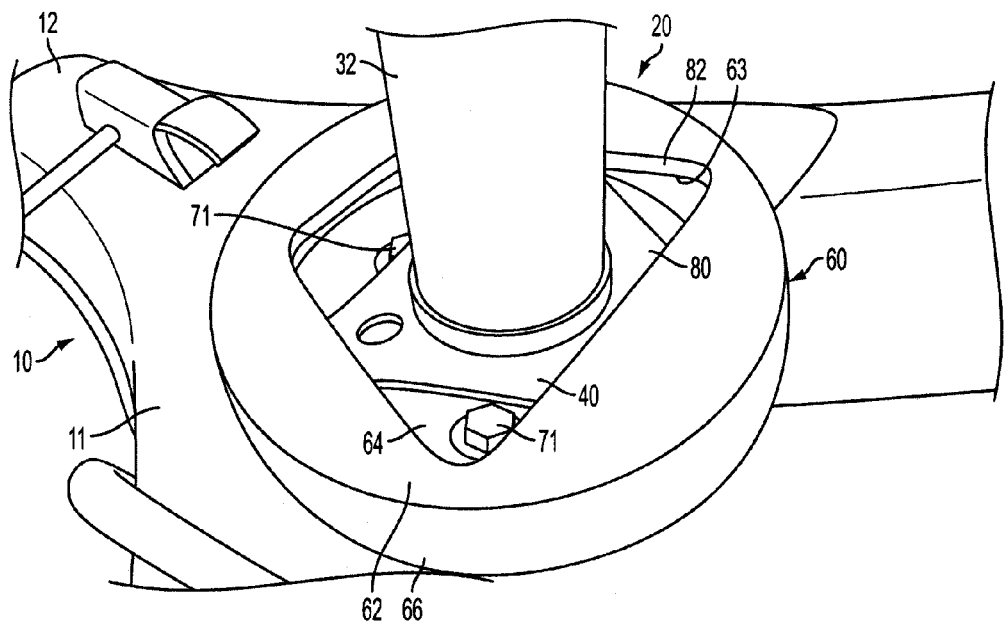
FIGS. 5 and 6 illustrate additional views of the jack and adaptor of FIG. 2, with the jack flange shown in engagement with the adaptor.
Figure 6:
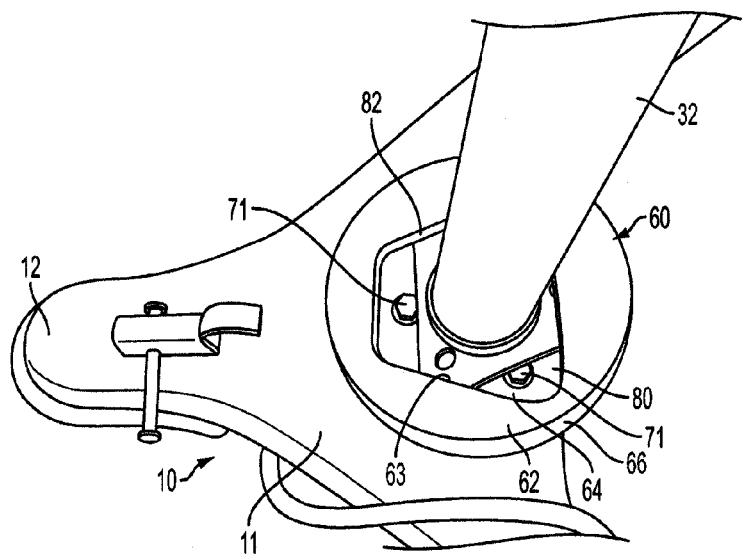
Figure 7:
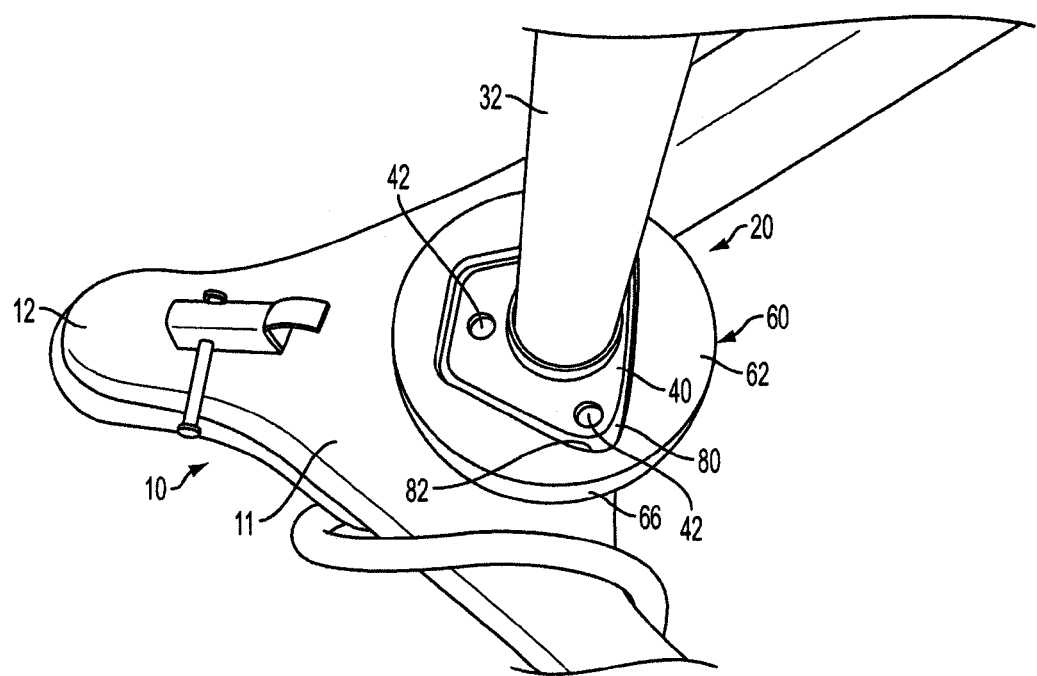
FIG. 7 illustrates the jack following rotation of the jack to position a jack flange portion of the jack in alignment with an opening in the mounting adaptor to allow removal of the jack from the mounting adaptor.

As can be seen in FIGS. 4 and 7, the jack can have a mounting flange 40 secured to a lower end of the housing 32. The illustrated mounting flange 40 in FIGS. 4 and 7 is trapezoidal in shape. When mounted in a conventional manner directly to the trailer tongue structure, the bolt holes of the jack flange (one being indicated at 42 in FIG. 4) are aligned with corresponding holes in a jack support portion of the trailer tongue structure with threaded bolts being inserted through the aligned holes to bolt the flange 40, and thereby the jack, directly to the trailer tongue structure.

In accordance with this disclosure, the flange is desirably not bolted or secured to the trailer as bolts are unnecessary. As an alternative, fasteners, such as non-threaded fasteners, or less desirably threaded bolts, for detachably mounting the jack to the adaptor can be used, but this would be less desirable as a loose fit or loose engagement of these components is more desirable.

Figure 2:
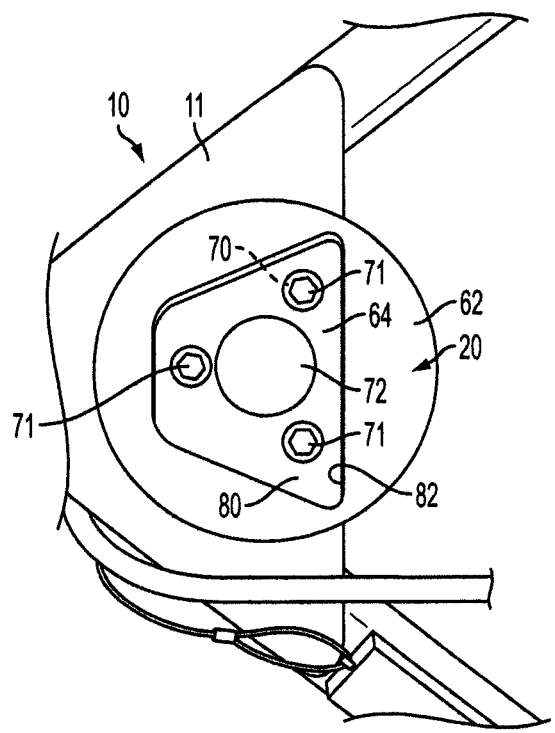
FIG. 2 is a top view of mounting adaptor of FIG. 1.
Figure 3:
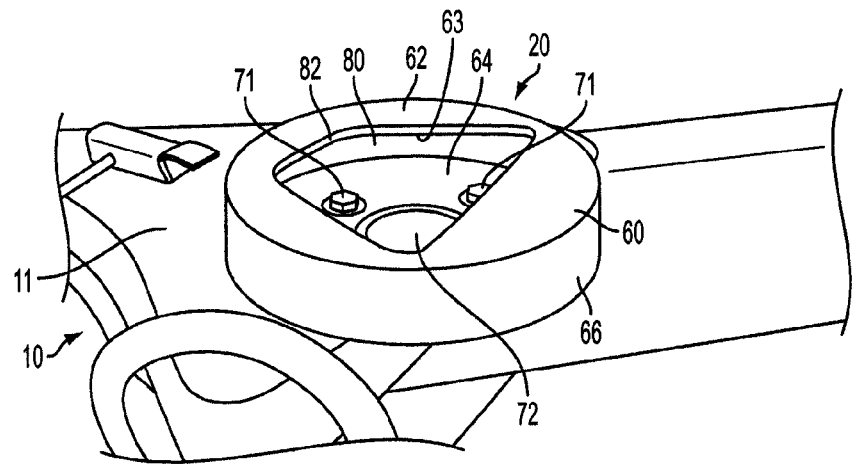
FIG. 3 is a perspective view of the mounting adaptor of FIG. 2.

As can be seen in FIGS. 2 and 3, the illustrated embodiment of mounting adaptor 20 comprises a housing or body 60 that desirably has a hollow interior with a top portion 62, a bottom portion 64 and a sidewall or body portion 66. The sidewall portion 66 can comprise a cylindrical wall and can be circular in cross-section. As one specific example, the sidewall portion 66 can be a right cylinder, smooth, and made of tubing, such as of a section of six inch outside diameter tubing, such as steel or other durable material (e.g., aluminum). The top and bottom portions 62, 64 can comprise plates, such as of steel or other durable material (aluminum being another example) that can be welded or otherwise secured to the upper and lower end portions of the body 66. The lower portion 64 can be provided with plural spaced apart openings, one being numbered as 70 in FIG. 2, for receiving fasteners such as bolts. Desirably, the openings 70 can be in the same pattern as openings in a conventional jack flange 40 provided with a trailer. This facilitates installation of the adaptor 20 as one simply needs to unbolt the jack from the trailer and bolt the adaptor 20 in place of the jack. In FIG. 2, the exemplary fastening bolts are numbered as 71.

An opening 72 is provided through the lower plate or bottom portion 64 of the adaptor 20 through which the jack post 26 can extend. This lower portion 64 can be a second wall or bottom end wall portion of the adaptor. Although not required, desirably opening 72 is sized to be only slightly larger than the post 26 such that the opening assists in guiding the post as it is raised and lowered. Although variable, in the illustrated example, opening 72 is circular in cross-section and, for example, can be about two inches in diameter. The top portion 62 comprises an opening 80 provided therethrough. The top portion 62 can be deemed to be a first wall or top end wall portion of the adaptor. The opening 80 is bounded by a periphery 82. The opening is sized and shaped to permit the insertion of the jack flange 40 downwardly through the opening with the post 26 extending downwardly through the opening 72 in the lower portion 64. The opening 80 is also shaped such that rotation of the jack relative to the trailer mounted adaptor 20 (for example, through 90 degrees, 180 degrees or other rotational amount), shifts the upper surface of the jack flange 40 to a position to engage the undersurface 63 of the top portion 62, such as the undersurface of a plate in the case of a top portion in the form of a plate. In this case, extension of the jack post 26 results in the application of force from the upper surface of the jack flange to the engaged portions of adaptor top portion 62, resulting in raising of the trailer as the jack post 26 is extended in a downward direction. Conversely, raising of the jack post 26 sufficiently while the trailer structure is supported, such as by a trailer hitch or other support, results in the upper surface of the jack plate 40 disengaging from the undersurfaces 63 of the portion 62, thereby permitting rotation of the jack to a position where the jack flange and jack can be removed upwardly through opening 80 from the adaptor 20.

In the specific example shown in FIGS. 2-7, the opening 80 defined by the periphery 82, is trapezoidal in shape. The opening can have other configurations while still facilitating entry of a jack flange, with or without a jack flange extension that can be rotated to engage the adaptor for use in jacking up the trailer. In addition, the jack flange 40 in one example is also trapezoidal in shape and can be slightly smaller than the opening 80. When the jack is in one orientation with the flange 40 aligned with the opening 80, the jack flange can readily drop into the interior of the adaptor 20. Rotation of the jack 180 degrees from the jack flange being aligned with the opening to the position shown in FIG. 4, positions a top portion and corner portions of the jack flange underneath corresponding engaging portions of the undersurface 63 of overlying adaptor top portion 62. The jack flange can also be of other shapes and can comprise an extension, such as explained below, while functioning to detachably engage the adaptor 20.

With the construction shown, the jack flange can be inserted through opening 80 and rotated to a position where it can engage the top portion 62. The post 26 can then be extended by rotating the jack handle 30 to thereby raise the trailer. Conversely, the jack can easily be disengaged from the trailer by reversing the direction of rotation of the handle 30 to raise the post 26 and lower the tongue of the trailer onto a trailer hitch or other support. Continued raising of the post 26 frees the jack flange 40 from the undersurface of portion 62 of adaptor 20, thereby permitting rotation of the jack to again align the jack flange with the opening 80 such that the jack flange and jack can be removed from the trailer for storage until the next use. With this construction, because the jack flange is removed from the trailer, it will not project downwardly where it can be bent if the trailer is driven with the jack post 26 in a downwardly extended position.

Other interfitting engagement mechanisms of the jack flange to a mounting adaptor can be used.

Figure 8:
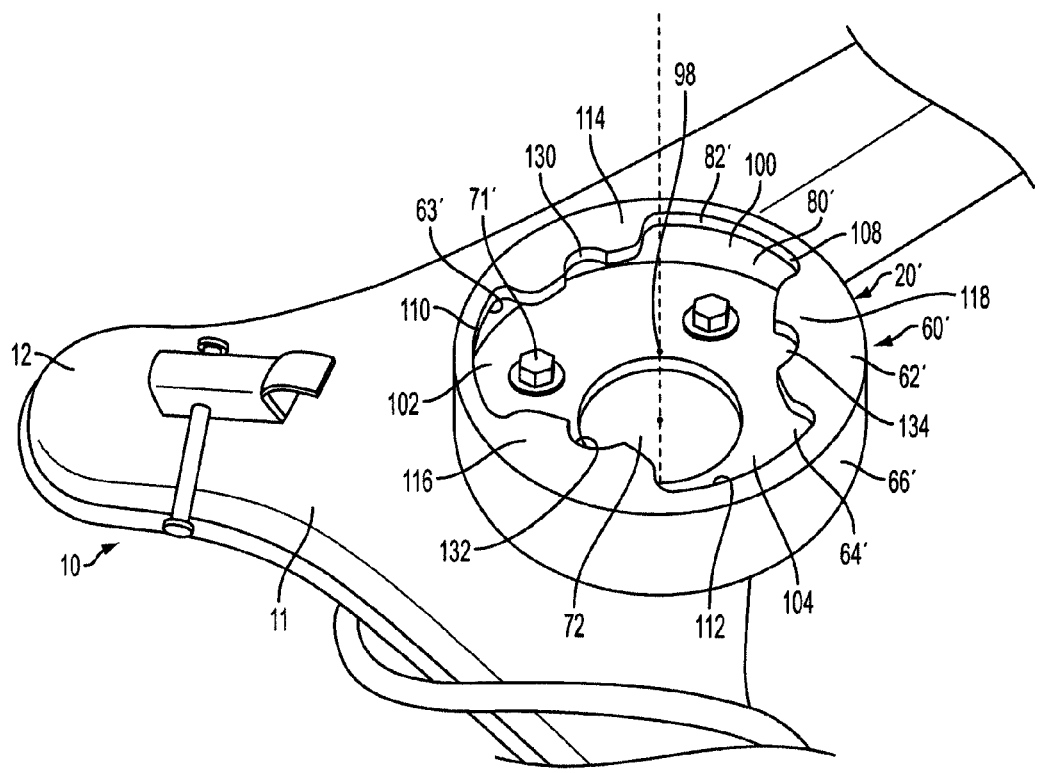
FIG. 8 is a perspective view of an alternative embodiment of a mounting adaptor for detachably coupling a jack to a trailer structure.

An alternative embodiment of adaptor 20' is shown in FIGS. 8-13. In these figures, components like those in the embodiment of FIGS. 1-7 are given like numbers except in the case of the adaptor 20' a prime "'" is used with the numbers for components corresponding to similar components of adaptor 20. In the embodiment of FIG. 8, the opening 80' is of a different configuration than the opening 80 shown in the embodiment of FIGS. 2-7 to illustrate that the opening can be varied while allowing the adaptor to function such as previously described to engage a jack flange with or without a jack flange extension when the trailer structure is being jacked up. In the embodiment of FIGS. 8-13, the opening 80' is bound by a periphery 82'. The opening in this example comprises a plurality of radially extending openings spaced about the center 98 of the opening 80'. Such openings can comprise lobe openings each extending radially outwardly from the center 98' toward the sidewall 66' of the adaptor body 60'. In FIG. 8, there are three such lobe openings 100, 102 and 104 each with a respective base 108, 110 and 112. The bases 108, 110 and 112 comprise respective portions of the periphery 82' of opening 80'. The exemplary bases 100, 102 and 104 are arcuate and, in the illustrated example, generally follow the curvature of the sidewall 66'. The respective lobe openings 100, 102 and 104 are separated from one another by lands that extend inwardly toward the center 98 such that the lands are nearer to the center than the bases of the lobe openings. For example, a land 114 is shown between opening 100 and opening 102, a land 116 is shown between opening 102 and opening 104, and a land 118 is shown between opening 104 and opening 100. The respective entrance openings leading to the lobe openings 100, 102 and 104 are necked down or narrowed at a location where a central portion of the opening 80' enters a respective lobe opening. From the necked down opening, the sides of the lobe opening perimeter diverge moving radially outwardly from center 98 until they intersect the respective associated base of the lobe opening.

In addition, each of the lands 114, 116 and 118 is desirably provided with a respective projection accommodating recess. These recesses can be designated as 130 for land 114; 132 for land 116; and 134 for land 118. The illustrated recesses 130, 132, 134 can be semi-circular in shape, but other shapes are suitable. The projection accommodating recesses 130, 132 and 134 engage projections from a jack flange or jack flange extension to stabilize the jack during use when the jack is rotated to a position for jacking up the trailer structure. The projections can, as explained below, comprise bolt heads (a bolt engaging nut is considered as a part of the associated bolt in this example) of bolts utilized to couple a jack flange extension to a jack flange. Alternatively, the projections can project upwardly from the jack flange and can be pins or other projections welded or otherwise mounted to the jack flange with or without a jack flange extension.

Figure 9A:
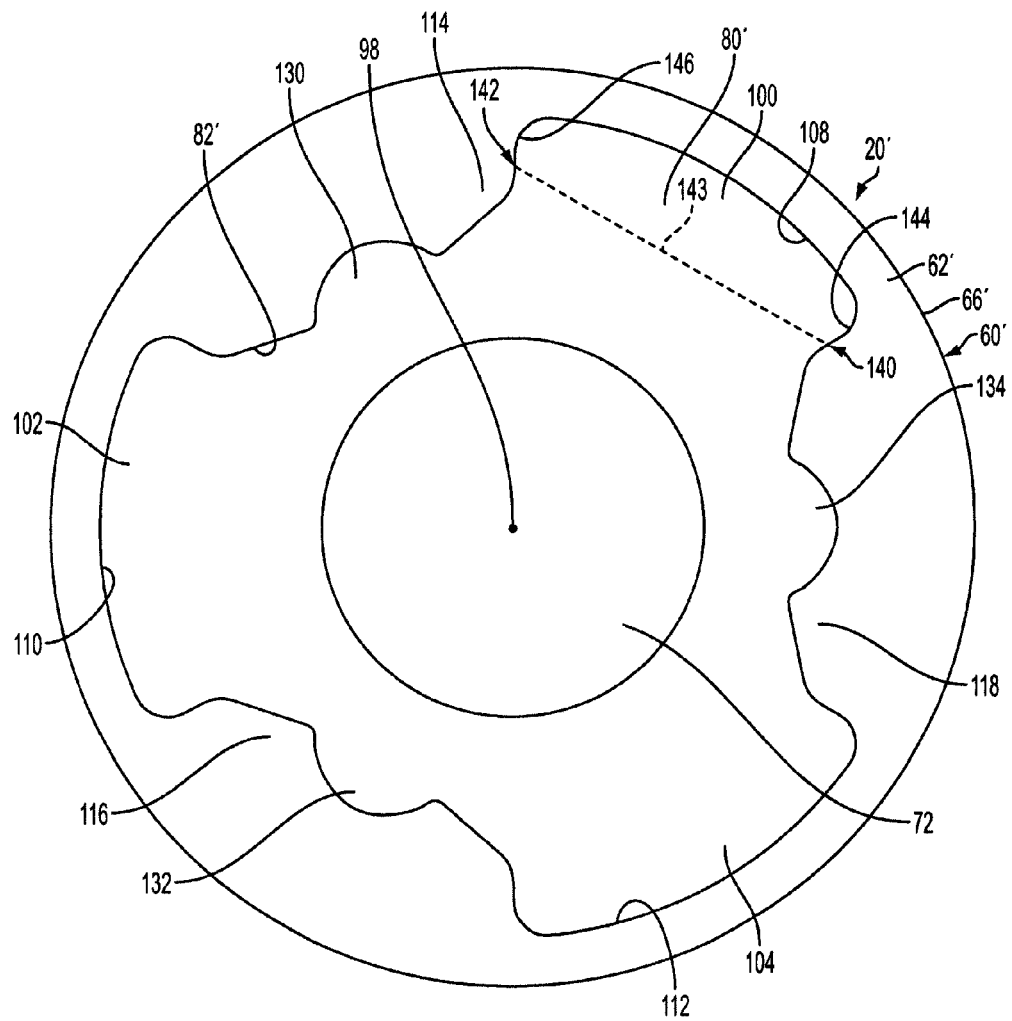
FIG. 9A is a top view of the adaptor embodiment of FIG. 8.

FIG. 9A illustrates a top view of the adaptor 20' which shows an exemplary opening 80' in greater detail. With reference to FIG. 9A, and in particular the lobe opening 100, a neck leading to lobe opening 100 is shown along a line 143 between arrows 140 and 142. A section 144 of the periphery 82' leading from arrow 140 to base 108 diverges from a section 146 of the periphery leading from arrow 142 to the base with the respective sections 144, 146 then converging in a rounded fashion to join the base 108.

Figure 9B:
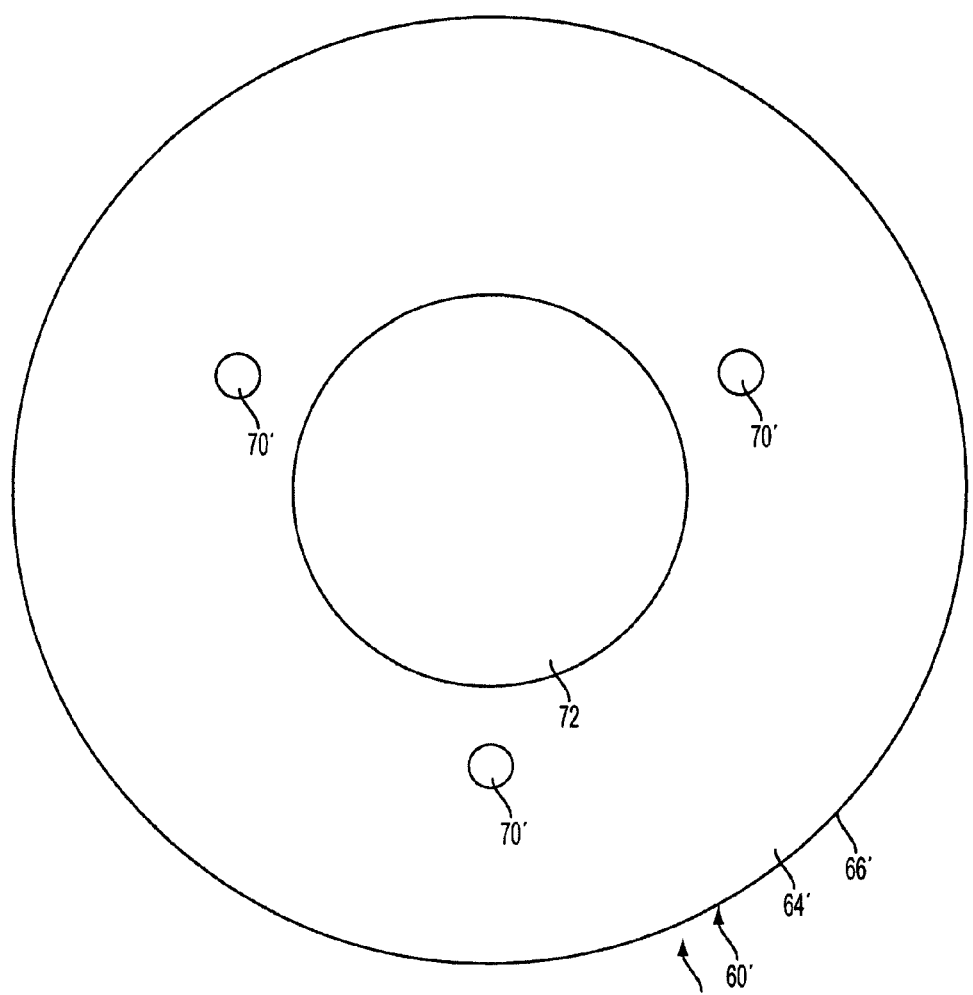
FIG. 9B is a bottom view of the adaptor embodiment of FIG. 9A.

FIG. 9B illustrates a bottom view of the adaptor 20'. This view shows openings 70' for use in receiving fasteners, such as bolts 71' that bolt the adaptor to the trailer structure 11 as shown in FIG. 8. FIG. 9B also shows the opening 72 through bottom portion 64' through which the jack post is inserted downwardly when the jack is to be used. The adaptor can be welded or otherwise secured to the trailer structure although bolts are an easy to use mounting approach.

Figure 10:
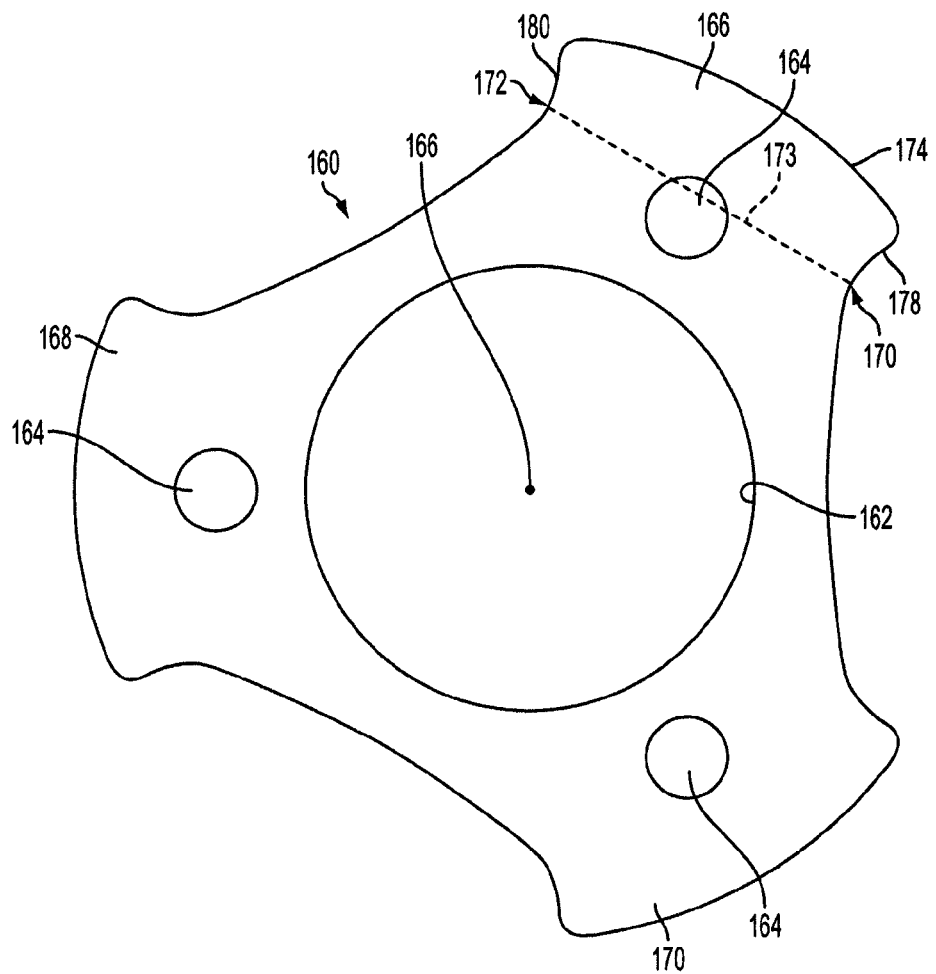
FIG. 10 is an exemplary embodiment of a jack flange extender for mounting to a jack flange for use in conjunction with the adaptor of FIGS. 9A and 9B.

In the embodiment of FIGS. 8-13, the jack flange can comprise a jack flange extension, such as indicated at 160 in FIG. 10. The illustrated jack flange extension comprises a central opening 162, which can be circular in configuration, although other opening shapes can be used. The opening 162 is sized to receive the jack housing 32 therethrough to permit the jack extension to slide downwardly along the housing to engage the upper surface of a jack flange, such as jack flange 40 in FIG. 4. The extension 160 also can comprise openings 164 spaced about the center 166 of the flange extension 160. These openings can be positioned for alignment with openings 42 (e.g., see FIG. 4 for one such opening) in a conventional jack flange. Thus, openings 164 can be aligned with corresponding associated openings 42 of a jack flange with these components then being bolted or otherwise secured together, such as by fasteners extending through the aligned openings to mount the jack flange extension 160 to the conventional jack flange. Welding or other techniques for mounting the extension to a jack flange or to a jack housing can be used. Alternatively, a jack flange extension can be mounted directly to the jack housing with the jack flange extension thus comprising a form of jack flange.

The illustrated jack flange extension 160 comprises a plurality of jack flange engaging members such as projections or lobes. Any number of such projections can be used. In FIG. 10, three such projections are indicated at 166, 168 and 170. These lobes have respective arcuate bases such as base 174 for lobe 166. These lobes correspond in shape to the lobe openings of a jack adaptor with three lobe openings 100, 102 and 104 as shown in FIG. 9A. There need not be a one to one match between the number of lobes of a jack extension and the number of lobes of a receiving opening, although this is desirable. That is, the construction of jack flange extension and the upper opening 80' in the adaptor 20' is such that the jack flange extension can be inserted downwardly through the opening 80' in the upper portion 62' of the adaptor 20' when the flange extension is aligned with the opening 80'. In one embodiment, the inserted extension can be rotated relative to the adaptor 20' such that the lobes can each engage the undersurface of a respective associated land when used for jacking up the trailer structure. As can be seen in the example of FIG. 10, each of the lobes 166, 168 and 170 can include a respective neck portion with one such neck portion being shown along line 173 between arrows 170 and 172 for the lobe or projection 166. A peripheral section 178 of lobe 166 diverges from an opposed peripheral section 180 moving toward base 174 from the neck portion until the respective sections 178, 180 reach a location near the base 174, at which location the respective sections 178, 180 then converge. Thus, a neck portion is formed in projection 166. A similar neck portion can be formed in each of the other projections 168 and 170. The neck portions of the lobes correspond to the necks of the respective lobe openings 100, 102 and 104 of FIG. 9A.

Figure 11:
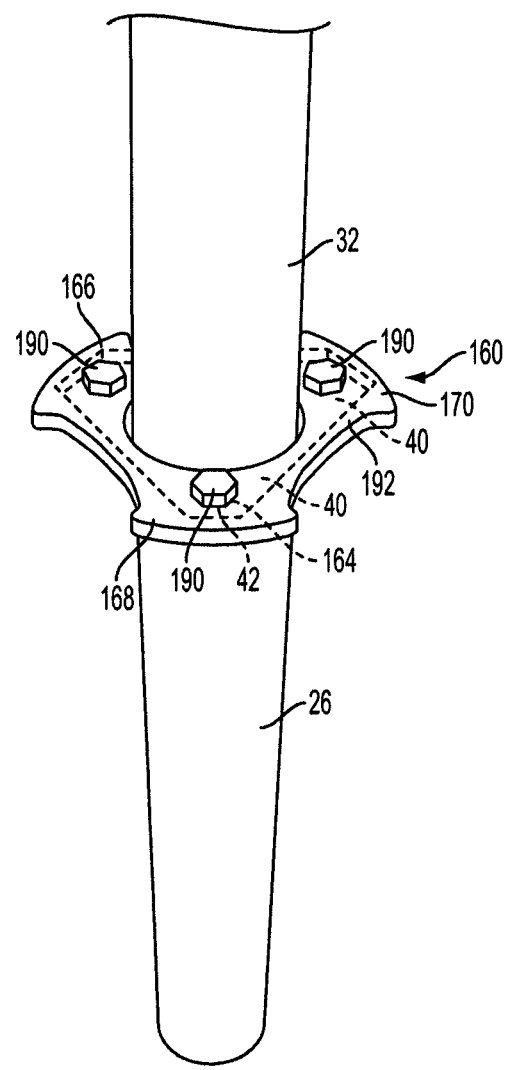
FIG. 11 illustrates the jack flange extension of FIG. 10 mounted to a jack flange of a conventional jack.

FIG. 11 illustrates the jack extension 160 mounted to a jack flange 40 with respective fasteners, in this case bolts 190 shown inserted through aligned openings 164 of the jack flange extension 160 and the openings 42 of the jack flange 40. These fasteners can be used to mount the jack flange extension 160 to the jack flange. The bolt heads, in this example, comprise one form of projection extending upwardly from the upper surface 192 of the jack flange extension.

Figure 12:
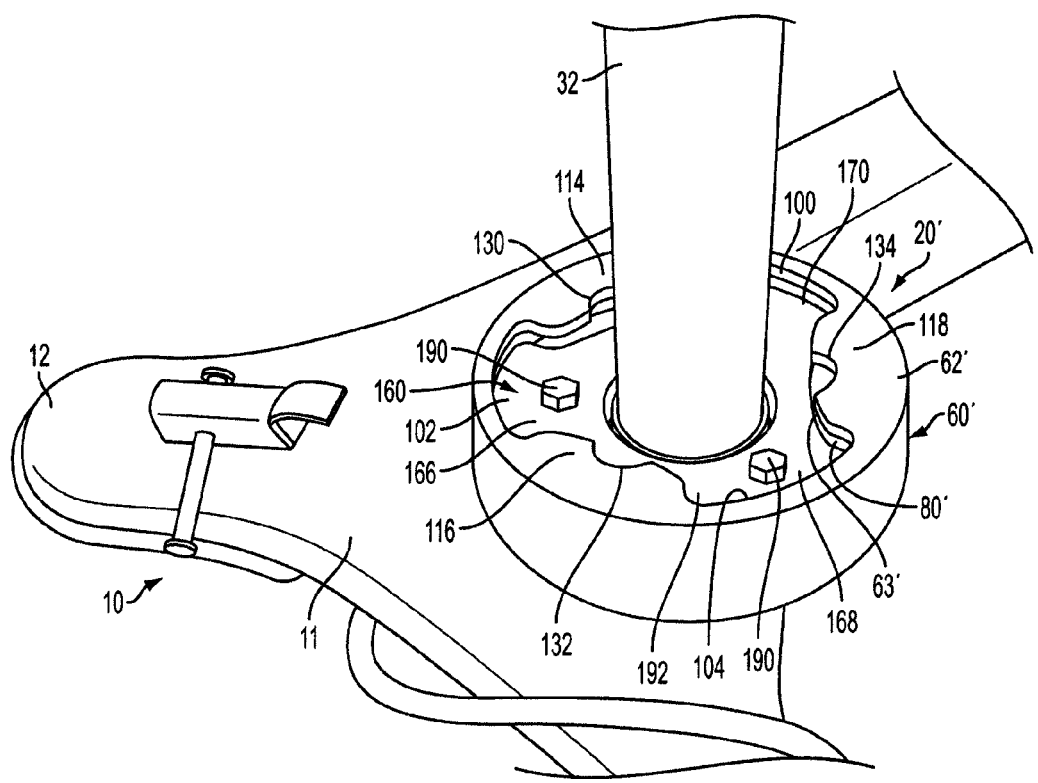
FIG. 12 illustrates the jack with a jack flange extension rotated to a position for insertion of the jack flange extension through the upper wall of the adaptor of FIG. 8.
Figure 13:
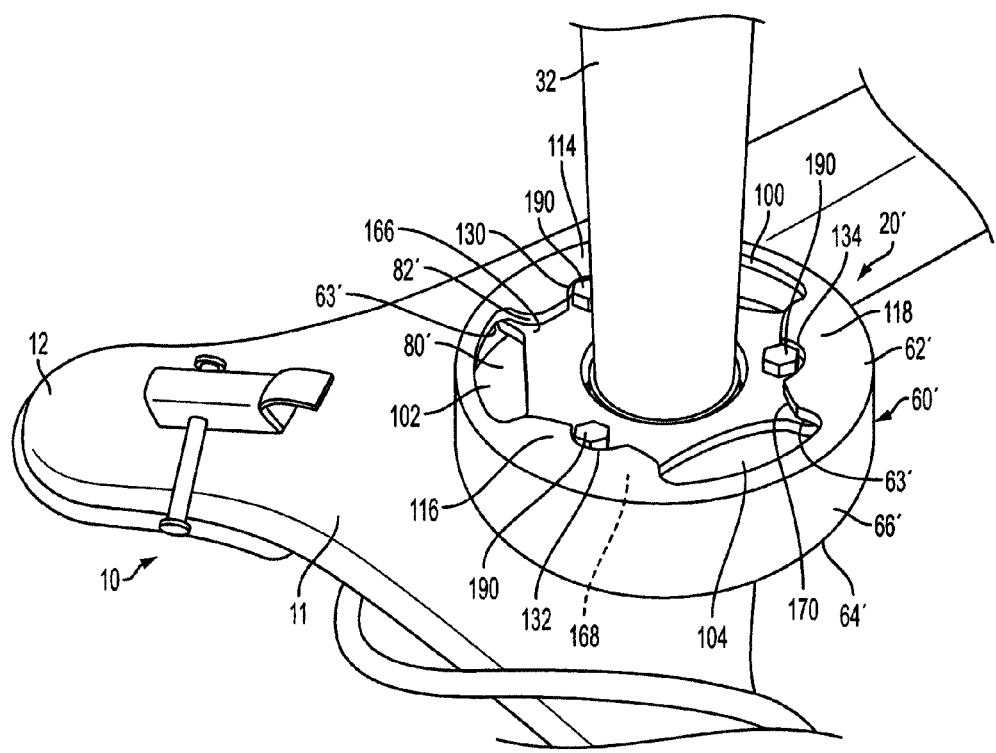
FIG. 13 illustrates the jack and jack flange extender rotated relative to the adaptor of FIG. 8 to position the jack flange extension for engaging the undersurface of the upper wall of the adaptor for use during jacking of the trailer structure.

FIG. 12 illustrates the jack and jack flange in one rotational position about its longitudinal axis with the jack flange extension oriented to position lobe or projection 166 of the jack flange extension in alignment with the lobe opening 102 of the opening 80' in upper portion 62' of the adaptor 20'. In the same manner, the projection 168 is aligned with the lobe opening 104 and the projection 170 is aligned with the lobe opening 100. As a result, with the jack post retracted into the jack housing 32 such that clearance is provided between the base of the jack post and the ground or other support, the jack flange extension 160 can be inserted downwardly into the jack adaptor until such time as the upper surface 192 of the jack adaptor is positioned beneath the undersurface 63' of the upper portion 62' of the adaptor 20'. More desirably, in an example where projections such as bolt heads 190 extend upwardly from the upper surface 192 of the jack flange extension 160, the jack is inserted sufficiently into the adaptor so that the upper surfaces of the projections 190 are positioned below the elevation of the undersurface 63' of the upper portion 62'. When positioned in this manner, as best shown in FIG. 13, the jack 32 can be rotated relative to the adaptor such that projection 166 underlies land 114, projection 168 underlies land 116 and projection 170 underlies land 118. In addition, the bolt head 190 associated with projection 170 is aligned with projection accommodating recess 134, the bolt head 190 associated with projection 166 is aligned with projection accommodating recess 130, and the bolt head 190 associated with land 168 is aligned with projection accommodating recess 132. The jack can then be raised to position the respective bolt heads or projections in their respective aligned and associated accommodating recesses with the jack then being actuated to extend the post and jack up the trailer. The projections, in this case bolt heads 190, in their respective recesses provide stability to the jack as during jacking the projections prevent rotation of the jack. In addition, in the example where three lobes are provided in the jack extension, three major support locations are provided at equally spaced locations about the longitudinal axis of the jack to provide a stable coupling of the jack extension to the jack adaptor. Also, the undersurface 63' of the upper portion 62' of the adaptor can be planar and the upper surface 192 of each of the projections 166, 168 and 170 of the jack extension can also be planar. Thus, the undersurfaces 63' and upper surfaces of the lobe projections interfit in abutting planar surfaces in this example to add stability to the engagement of these components.

To remove the jack from the position shown in FIG. 13, one merely retracts the jack post into the jack housing 32 (e.g., after the tongue 12 of the trailer is on a trailer hitch or other support). When the jack post has been retracted sufficiently, the jack can be urged downwardly to disengage the bolt heads 190 from their accommodating recesses. The jack can then be rotated to align the projections or extension portions 166, 168 and 170 with respective lobe openings 100, 102 and 104 to permit the jack to be lifted free of the jack adaptor 20'.

It should be noted that the jack can be rotated to a number of different positions to align the lobes with respective lobe openings because, in this example, the lobe openings and projections are of similar shapes. Alternatively, one or more of the lobe openings and projections or lobes can be of differing shapes. For example, one lobe opening can be keyed or shaped to match the shape of a corresponding projection with the other lobe openings being similarly keyed to the shape of their associated projections. With this construction, the jack would only be insertable into the adaptor in one rotational orientation relative to the trailer structure mounted adaptor.

Having illustrated and described the principles of this invention with reference to exemplary embodiments, it should be apparent to those of ordinary skill in the art that the embodiments may be modified in arrangement and detail without departing from the principles of this invention. All such modifications are encompassed in this disclosure.

I claim:

1. A trailer hitch adaptor for mounting to a trailer hitch structure of a trailer for use in detachably receiving a jack used to raise and lower the trailer, the jack comprising a jack housing comprising a first end portion and a jack flange mounted to the jack housing, the jack also comprising a jack post extendable from the jack housing and retractable at least partially into the jack housing through the first end portion of the jack housing, the trailer hitch adaptor comprising:

a body comprising first and second spaced apart walls, the first wall comprising a first opening and the second wall comprising a second opening at least partially aligned with the first opening and sized for insertion of the jack post through the first and second openings;

wherein the first opening is sized and shaped to permit the insertion of the jack flange therethrough when the jack is in a first position relative to the first opening and to prevent the passage of the jack flange through the first opening upon rotation of the jack flange to a second position relative to the first opening;

wherein the second wall is adapted for mounting to the trailer hitch structure; and wherein the jack flange is trapezoidal in shape and wherein the first opening is also trapezoidal in shape.

2. A trailer hitch adaptor according to claim 1 wherein the second opening is circular.

3. A trailer hitch adaptor for mounting to a trailer hitch structure of a trailer for use in detachably receiving a jack used to raise and lower the trailer, the jack comprising a jack housing comprising a first end portion and a jack flange mounted to the jack housing, the jack also comprising a jack post extendable from the jack housing and retractable at least partially into the jack housing through the first end portion of the jack housing, the trailer hitch adaptor comprising:

a body comprising first and second spaced apart walls, the
first wall comprising a first opening and the second wall
comprising a second opening at least partially aligned
with the first opening and sized for insertion of the jack
post through the first and second openings;
wherein the first opening is sized and shaped to permit the
insertion of the jack flange therethrough when the jack is
in a first position relative to the first opening and to
prevent the passage of the jack flange through the first
opening upon rotation of the jack flange to a second
position relative to the first opening;
wherein the second wall is adapted for mounting to the
trailer hitch structure;
wherein the first opening comprises a plurality of lobes;
wherein the jack flange comprises a plural lobed jack
flange extension; and
comprising plural bolts extending through the jack flange
extension to bolt the jack flange extension to the jack
flange.

4. A trailer hitch adaptor according to claim 3 wherein the first and second walls each have a respective peripheral boundary and wherein the body comprises a sidewall interconnecting at least a portion of the peripheral boundary of the first wall to at least a portion of the peripheral boundary of the boundary of the second wall.

5. A trailer hitch according to claim 3 wherein the first opening is tri-lobular and the jack flange comprises three lobes.

6. A trailer hitch adaptor for mounting to a trailer hitch structure of a trailer for use in detachably receiving a jack used to raise and lower the trailer, the jack comprising a jack housing comprising a first end portion and a jack flange mounted to the jack housing, the jack also comprising a jack post extendable from the jack housing and retractable at least partially into the jack housing through the first end portion of the jack housing, the trailer hitch adaptor comprising:
a body comprising first and second spaced apart walls, the
first wall comprising a first opening and the second wall
comprising a second opening at least partially aligned
with the first opening and sized for insertion of the jack
post through the first and second openings;
wherein the first opening is sized and shaped to permit the
insertion of the jack flange therethrough when the jack is
in a first position relative to the first opening and to
prevent the passage of the jack flange through the first
opening upon rotation of the jack flange to a second
position relative to the first opening;
wherein the second wall is adapted for mounting to the
trailer hitch structure; and
wherein the first opening has a center and comprises plural
lobe openings each with a base spaced from the center of
the first opening, the lobe openings each being separated
from one another by a land, the land having a periphery
spaced nearer to the center of the first opening than the
bases of the lobe openings, each land comprising a projection accommodating recess, the jack flange extension
comprising plural jack adaptor engaging members
extending outwardly from the jack housing, a respective
projection extending upwardly from each jack adaptor
engaging member, the projections being arranged such
that the jack adaptor engaging members are each positioned within a respective projection accommodating
recess with the jack flange in the second position.

7. A trailer hitch adaptor according to claim 6 wherein the jack flange is loosely received by the trailer hitch adaptor without any fasteners coupling the jack or jack flange to the trailer hitch adaptor.

8. A trailer hitch and trailer hitch adaptor assembly according to claim 6 wherein the first and second walls comprise a respective first top plate and a second bottom plate.

9. A trailer hitch adaptor for mounting to a trailer hitch structure of a trailer for use in detachably receiving a jack used to raise and lower the trailer, the jack comprising a jack housing comprising a first end portion and a jack flange mounted to the jack housing, the jack also comprising a jack post extendable from the jack housing and retractable at least partially into the jack housing through the first end portion of the jack housing, the trailer hitch adaptor comprising:
a body comprising first and second spaced apart walls, the
first wall comprising a first opening and the second wall
comprising a second opening at least partially aligned
with the first opening and sized for insertion of the jack
post through the first and second openings;
wherein the first opening is sized and shaped to permit the
insertion of the jack flange therethrough when the jack is
in a first position relative to the first opening and to
prevent the passage of the jack flange through the first
opening upon rotation of the jack flange to a second
position relative to the first opening;
wherein the second wall is adapted for mounting to the
trailer hitch structure;
wherein the first and second walls comprise a respective
first top plate and a second bottom plate; and
wherein the first and second plates are circular, the body
comprising a sidewall of a right cylindrical shape, the
first and second walls comprising circular peripheral
edges that are interconnected by the sidewall.

10. An adaptor according to claim 9 wherein the first opening comprises a non-circular geometric shape and the second opening is circular.

11. A trailer hitch adaptor for mounting to a trailer hitch structure of a trailer for use in detachably receiving a jack used to raise and lower the trailer, the jack comprising a jack housing comprising a first end portion and a jack flange mounted to the jack housing, the jack also comprising a jack post extendable from the jack housing and retractable at least partially into the jack housing through the first end portion of the jack housing, the trailer hitch adaptor comprising:
a body comprising first and second spaced apart walls, the
first wall comprising a first opening and the second wall
comprising a second opening at least partially aligned
with the first opening and sized for insertion of the jack
post through the first and second openings;
wherein the first opening is sized and shaped to permit the
insertion of the jack flange therethrough when the jack is
in a first position relative to the first opening and to
prevent the passage of the jack flange through the first
opening upon rotation of the jack flange to a second
position relative to the first opening;
wherein the second wall is adapted for mounting to the
trailer hitch structure; and
wherein the second wall comprises a plurality of fastener
receiving openings for receiving fasteners to couple the
body to the trailer hitch; the first and second walls each
have a respective peripheral boundary and wherein the
body comprises a sidewall interconnecting at least a
portion of the peripheral boundary of the first wall to at
least a portion of the peripheral boundary of the boundary of the second wall; wherein the jack flange comprises a three lobed jack flange extension; wherein plural
bolts extend through the jack flange extension to bolt the
jack flange extension to the jack flange; and wherein the
first opening comprises three lobe openings each with a
base spaced from the center of the first opening, the lobe openings each being separated from one another by a land with a periphery spaced nearer to the center of the first opening than the bases of the lobe openings, each land comprising a bolt accommodating recess; and wherein the bolts are arranged such that the bolts are each positioned within a respective bolt accommodating recess when the jack flange is in the second position.

12. An adaptor for detachably coupling a jack to a trailer for use in jacking the trailer, the jack comprising a jack housing with a jack housing longitudinal axis and a jack flange projecting outwardly from the housing, the jack also comprising a jack post extendable from the jack housing to raise the trailer during jacking and retractable into the jack housing to lower the trailer during jacking, the adaptor comprising:
- a housing comprising first and second spaced apart end portions and a body portion joining the first end portion to the second end portion, the second end portion being adapted for coupling to the trailer with the first end portion positioned at an elevation above the second end portion;
- the first end portion comprising a first opening therethrough and the second end portion comprising a second opening extending therethrough, the first and second openings overlying one another, at least in part, and being sized such that the jack post is insertable through both the first and second openings from above when the second end portion is coupled to the trailer, the first opening being sized and shaped such that the jack flange is insertable downwardly through the first opening into the space between the first and second end portions at least when the jack housing is in one rotational position about the jack housing longitudinal axis relative to the first opening and such that the jack flange engages the first end portion at least when the jack housing is in a second rotational position about the jack housing longitudinal axis to prevent upward removal of the jack flange and jack through the first opening, whereby when the jack housing is in the second position, extension of the jack post from the jack housing operates to jack up the trailer;
- wherein the first opening comprises a plurality of lobe openings separated by lands positioned between the lobe openings; and
- wherein the lands each comprise a respective recess extending into the land in a direction away from the center of the first opening.

13. An adaptor according to claim 12 wherein the first and second end portions comprise respective first and second end plates each with a respective periphery and wherein the body portion comprises a wall extending about the periphery of the first and second end plates.

14. An adaptor according to claim 12 wherein the second end portion comprises a plurality of fastener receiving openings positioned to receive fasteners operable to fasten the second end portion and thereby the housing to the trailer.

15. An adaptor according to claim 12 wherein the jack flange comprises plural projections projecting upwardly from the jack flange each positioned in a respective one of the recesses of the first opening at least when the jack housing is in the second rotational position and is in engagement with the jack adaptor.

16. An adaptor for detachably coupling a jack to a trailer for use in jacking the trailer, the jack comprising a jack housing with a jack housing longitudinal axis and a jack flange projecting outwardly from the housing, the jack also comprising a jack post extendable from the jack housing to raise the trailer during jacking and retractable into the jack housing to lower the trailer during jacking, the adaptor comprising:
- a housing comprising first and second spaced apart end portions and a body portion joining the first end portion to the second end portion, the second end portion being adapted for coupling to the trailer with the first end portion positioned at an elevation above the second end portion;
- the first end portion comprising a first opening therethrough and the second end portion comprising a second opening extending therethrough, the first and second openings overlying one another, at least in part, and being sized such that the jack post is insertable through both the first and second openings from above when the second end portion is coupled to the trailer, the first opening being sized and shaped such that the jack flange is insertable downwardly through the first opening into the space between the first and second end portions at least when the jack housing is in one rotational position about the jack housing longitudinal axis relative to the first opening and such that the jack flange engages the first end portion at least when the jack housing is in a second rotational position about the jack housing longitudinal axis to prevent upward removal of the jack flange and jack through the first opening, whereby when the jack housing is in the second position, extension of the jack post from the jack housing operates to jack up the trailer; and
- comprising a jack flange attachment adapted for mounting to the jack flange, the jack flange attachment comprising a tri-lobular attachment, the first opening also comprising a tri-lobular opening.

17. An adaptor according to claim 16 wherein the first opening has three lobe openings defined by an interior peripheral edge of the first end portion, each of said lobe openings having a neck portion defined by converging walls that converge in a direction away from the center of the first opening and an enlarged end portion communicating with the neck portion and positioned at a location further from the center of the first opening than the neck portion.

* * * * *